R. P. SMITH.
Glass Valve and Chest.
No. 227,067. Patented April 27, 1880.
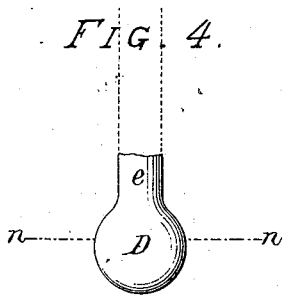
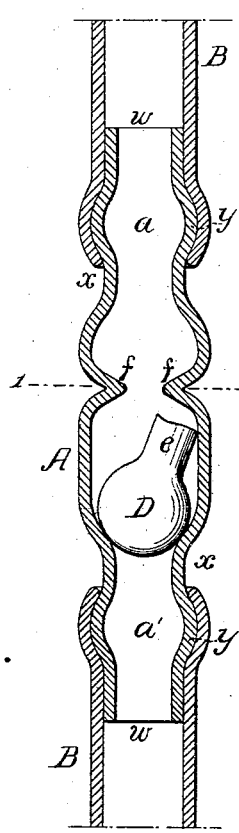
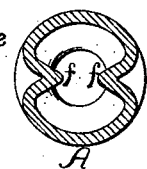
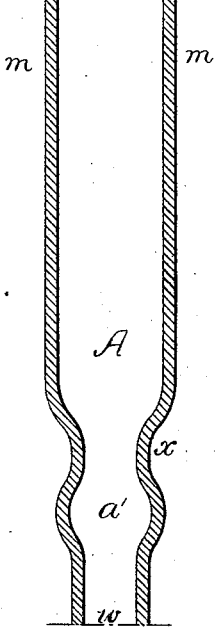
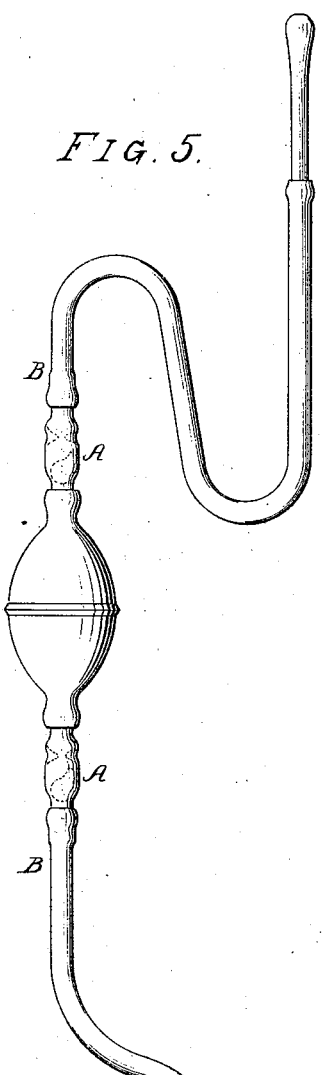
Witnesses
J. M. Deemer
Harry Smith
Inventor
Robert Pearsall Smith
by his Attorneys
Howson and Son

UNITED STATES PATENT OFFICE.

ROBERT PEARSALL SMITH, OF PHILADELPHIA, PENNSYLVANIA, ASSIGNOR TO HIMSELF, JAMES WHITALL, CHAS. ROBERTS, AND W. H. NICHOLSON, OF SAME PLACE, J. M. MICKLE, OF MILLVILLE, NEW JERSEY, AND CHAS. A. TATUM, OF NEW YORK, N. Y.

GLASS VALVE AND CHEST.

SPECIFICATION forming part of Letters Patent No. 227,067, dated April 27, 1880.

Application filed February 6, 1880.

*To all whom it may concern:*

Be it known that I, ROBERT PEARSALL SMITH, a citizen of the United States, residing in Philadelphia, Pennsylvania, have invented an Improvement in Glass Valves and Chests, of which the following is a specification.

The object of my invention is to so construct a valve of glass that it can be readily and cheaply manufactured, and will be self-guiding in the chest to which it is adapted. This object I attain in the manner and by the process too fully described hereinafter to need preliminary explanation.

In the accompanying drawings, Figure 1 is a sectional view, drawn to an enlarged scale, of the glass valve-chest with valve in elevation; Fig. 2, a transverse section on the line 1 2, Fig. 1; Figs. 3 and 4, views illustrating the mode of making the valve-chest, and Fig. 5 a view of one of the instruments to which my invention may be applied.

In Figs. 1 and 2, A is the valve-chest, and $a\ a'$ its two branches, each of which is contracted at $x$, where it meets the chest, and expanded at $y$, from which point it may be cylindrical or tapering to its extreme end, $w$. The object of making each branch of this shape, in the present instance, is for insertion and retention in the end of a rubber tube, B, which, being expanded at the enlargement $y$ and contracted at $x$, cannot be removed from the branch without considerable effort. I do not, however, desire to restrict myself to this particular kind of branch.

The glass valve D consists of a stem, $e$, having a spherical enlargement adapted to the seat formed at one end of the chest in making the neck $x$. The movement of the valve is limited by internal projections, $f$, (two in the present instance,) made by external indentations while the glass is hot.

In making the chest, a glass tube is first reduced to the condition shown in Fig. 3, the branch $a'$ being formed on the tube while it is hot by appliances and in a manner well known to those familiar with the glass-maker's art. The valve D, Fig. 4, is then introduced into the large end of the tube, after which the portion $m$, while it is hot, is formed into the branch $a$, and indentations made in the chest for the formation of the internal projections, $f f$.

The object of making the valve D of the peculiar shape shown is twofold: First, a glass sphere without the stem $e$ must be true throughout, so as to always fit snugly to the seat, and to make such a sphere would be a difficult and costly proceeding, whereas it is an easy matter to form on the end of a glass rod, Fig. 4, an enlargement, the portion of which below the line $n\ n$ shall be a section of a true sphere. Second, the stem of the valve, when the latter is in the chest, prevents all but the true portion of the spherical enlargement from coming in contact with the seat.

While the device possesses the advantages of cleanliness and freedom from corrosive influences, it has the further advantage, due to the transparency of the glass, of exhibiting any defect in the action of the valve; hence the device is especially applicable to the injecting-syringe shown in Fig. 5, and to other analogous medical and surgical appliances, the valves always fitting tight enough to their seats for all practical purposes.

I do not desire to claim, broadly, a valve made of glass, or a glass valve combined with a glass valve-chest; but

I claim as my invention—

The combination of the glass valve, consisting of a stem having a spherical enlargement, with a glass chest, A, substantially as described.

In testimony whereof I have signed my name to this specification in the presence of two subscribing witnesses.

ROBERT PEARSALL SMITH.

Witnesses:
 JAMES F. TOBIN,
 HARRY SMITH.